Nov. 9, 1926. Re. 16,466

C. A. FRIEDRICH

SOCKET FOR VACUUM TUBES OR THE LIKE

Original Filed Dec. 9, 1921

INVENTOR

Charles A. Friedrich,

BY

ATTORNEY

Reissued Nov. 9, 1926. Re. 16,466

UNITED STATES PATENT OFFICE.

CHARLES A. FRIEDRICH, OF BELLEROSE, NEW YORK, ASSIGNOR TO ALDEN MANUFACTURING COMPANY, OF SPRINGFIELD, MASSACHUSETTS, A CORPORATION OF MASSACHUSETTS.

SOCKET FOR VACUUM TUBES OR THE LIKE.

Original No. 1,505,329, dated August 19, 1924, Serial No. 521,083, filed December 9, 1921. Application for reissue filed August 13, 1926. Serial No. 129,061.

The present invention relates to electric sockets particularly for vacuum tubes used in electric wireless apparatus.

It is well known that the transmission of outside vibrations through the tube socket to the vacuum tube in radio transmitting and receiving devices is very detrimental to the proper functioning of such tubes. If these vibrations are of large amplitude, it is quite possible that the electrodes in the tube may be thrown together, causing short circuits and probably burn-outs of the tube filament or of its associated apparatus. Also, these vibrations, by periodically displacing the elements, change the characteristics of the tube, thus causing modulation in such devices as are used for radio frequency, and direct changes of anode current in those used at audio frequencies, either of which phenomena result in the conversion of mechanical vibrations into audio frequency currents in the output of the system.

Various devices have been constructed to absorb such outside vibrations and shocks but most of such devices are too cumbersome and not sufficiently sensitive. Besides, such devices require too much valuable space in wireless apparatus.

In order to overcome these inconveniences, inefficiencies and drawbacks, I have constructed a novel vacuum tube socket which is equipped with means for absorbing outside vibrations, shocks, etc., and which is adapted to occupy comparatively small space.

With this object in view, my invention consists in that, contrary to the existing sockets in which the tube is held substantially non-yielding in the socket, my new socket is provided with shock absorbed combined contacting and holding means which will support the tube so as to hold it yieldingly and out of physical contact with the socket proper, these means largely preventing transmission and mechanical vibration to the tube and its elements.

Figure 1:
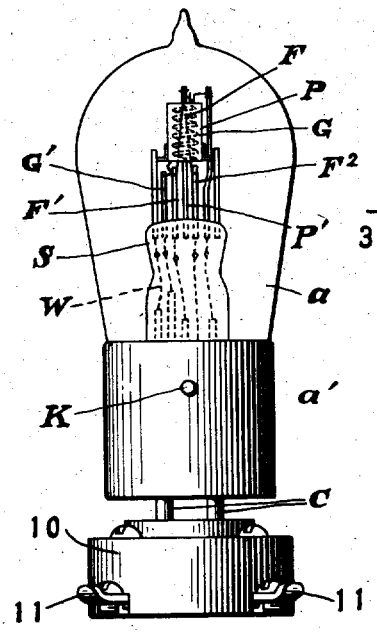
Figure 2:
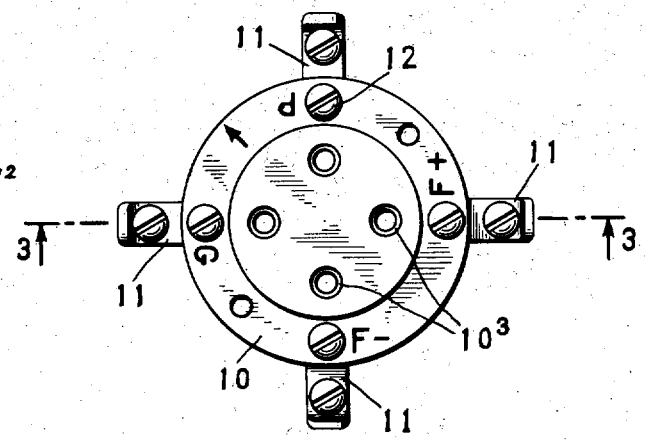
Figure 3:
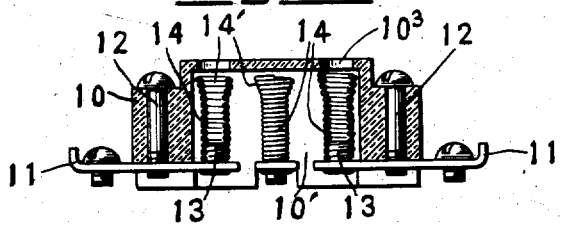
Figure 4:
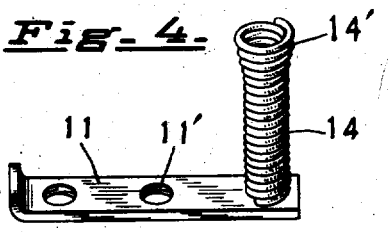
Figure 6:
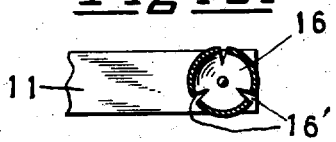
Figure 5:
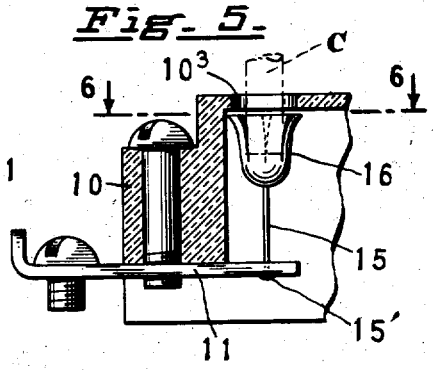
Figure 8:
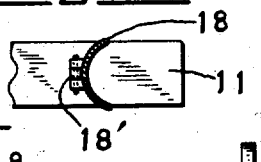
Figure 7:
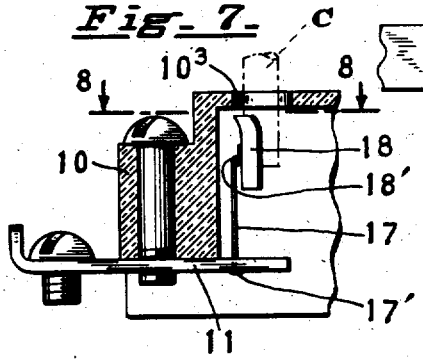

My invention will be more fully understood by reference to the accompanying drawing in which similar reference characters denote corresponding parts, and in which, Fig. 1 is an elevation of a vacuum tube equipped with my novel socket; Fig. 2 is an enlarged top plan view of the socket proper; Fig. 3 is an enlarged section on line 3—3 of Fig. 2; Fig. 4 is an enlarged perspective view of a terminal arm carrying a coil forming part of my novel socket; Fig. 5 is a similar section to Fig. 3 of a part of the socket somewhat modified; Fig. 6 is a section on line 6—6 of Fig. 5; Fig. 7 is a similar section to Fig. 5 of a further modification of the socket, and Fig. 8 is a section on line 8—8 of Fig. 7.

Referring to the drawing more in detail, *a* denotes the bulb ordinarily called the vacuum tube and generally used in wireless systems for receiving or sending purposes. In this tube, P denotes the so-called plate made in form of a sleeve which encloses the grid G and filament F, the grid, filament and plate being insulated from one another and conductively connected to the leads F′, $F^2$, G′, and P′, which pass through the insulation stem S and connect with wires W, leading to the contact pins or prongs C projecting from the metal frame or sleeve *a′* of the tube.

In previous constructions of sockets for vacuum tubes, the electric connections between the terminal prongs of the vacuum tube and its associated apparatus have been effected by means of a socket enclosing the base of the tube, said socket being provided with a number of springs adapted to make direct contact with said prongs. Such sockets are usually fixed to a stationary structure such as a panel, panel board frame or receiving set. When the tube is engaged in such a socket, it forms with it a substantially rigid piece so that shocks or vibrations to which the complete apparatus may be subjected are transmitted directly to the elements of the tube. This detrimental effect I have avoided in the following manner.

The socket 10 according to this invention, comprises a disc of insulation material hollow as at 10′ and open at its bottom and which is formed in its top with a plurality of perforations $10^3$. At its bottom the disc is formed with radial grooves $10^2$ through which extend metal arms 11 forming the terminals for the electric wires (not shown).

These arms are held in position by screw bolts 12 fixed in the disk. There are as many perforations as there are prongs or pins C, thus in the present case four, and the same are arranged to register with and made somewhat wider than the diameter of said prongs, so that the latter may freely pass through said perforations. Arranged in the hollow 10′ of the disk are sockets 14 made according to the structure shown in Figs. 3 and 4 of coiled spring wire, such as copper, the upper ends of which sockets are universally yieldable. These sockets are suitably secured in upright position to the inner ends of the terminal arms 11 to extend close to the inner face of the top of the disk and to register with the perforations $10^3$ therein. For fastening said coils in position to the arms 11 short screw bolts 13 are riveted or otherwise fixed to the latter and onto which the coils are threaded like nuts. The screw bolts will engage only a few of the lower windings of the coils leaving the major portion of the latter flexible, so that the same may yield in different directions. The coils 14 are in diameter so admeasured as to snugly engage around the prongs C passed through tht perforations $10^3$ of the disk, and thereby not only hold the tube securely in position but also form an effective contact. A few of the top windings 14′ of said coils are somewhat widened to facilitate the passage of the prongs into the coils. In length the coils are so admeasured that the prongs when engaged will not extend to the inner ends of the screw bolts 13, and owing to the spring force of the coils, the tube will be held at an elevation from the upper face of the disk, creating a free space between the bottom of the metal sleeve $a'$ and the disk sufficient to prevent physical contact and thereby the transmission of shocks or vibrations from the socket to the tube.

Of course, instead of coils other shock absorbing means may be employed.

Thus according to Figs. 5 and 6 resilient or spring rods 15 may be fixed to the terminal arms at 15′ and provided at their upper ends with split cup shaped socket contact members 16 serving to engage the prongs C. The mouth portion of said members may be widened to facilitate the passage of the prongs. By splitting the members longitudinally the latter will be made to fit various thicknesses of the prongs or to adapt themselves to irregularities thereof, such as different sized pins and variation of spacing.

Another modification is shown in Figs. 7 and 8. There semicylindrical or trough shaped socket contact members 18 are hinged at 18′ to resilient pins or rods 17 fixed to the arms 11 as at 17′.

By hinging the members 18 to the rods or pins 17 and arranging them with their open faces opposite one another provision is made to prevent failure of effective contact between the prongs C and said members 18 by reason of irregular shapes, sizes or bends occurring in the prongs.

Owing to the flexible support of the contact socket members, such as the coils 14, the cups 16 or troughs 18 the engagement of the prongs C therewith will be insured even though the latter may not be properly spaced due to some fault in the manufacture, or may have been accidentally bent.

The tube base or sleeve $a'$ is usually provided with a pin or projection K. This pin is utilized in the present construction of the socket to facilitate the positioning of the vacuum tube relative to the socket 10. On the upper face of the socket an arrow (see Fig. 2) is marked indicating the position of the pin K when inserting the tube, so that the wires may be properly connected to the corresponding electrodes. The latter may be marked, as shown, on the disk opposite the terminals.

The top of the insulating disc 10 serves as a positive stop for the base $a'$ of the vacuum tube in case the contacts fail to limit the insertion of the prongs. The said top plate also serves to limit the lateral tilting action of the tube either by the engagement of the prongs C with the sides of the prong openings $10^3$ or by the engagement of the base $a'$ of the tube with the outer edge of the insulating disc. The insulating top piece being connected to the body of the disc also serves as a stripper to prevent the undue elongation of the springs 14 when the prongs of the tube are being withdrawn. The insulating top piece with the holes $10^3$ serves as a guide for the prongs or pins C when inserting the same to the contacts and prevents undue twisting of the tube and contacts.

There may be other modifications made by those skilled in the art without departing from the principle of my invention. I, therefore, do not wish to restrict myself to the details shown and described. The forms of construction shown in Figs. 5 to 7 are claimed specifically in my concurrent divisional reissue applications Nos. 129,062 and 129,063.

What I claim and desire to secure by Letters Patent is:—

1. In a socket for a vacuum tube having projecting contact members, an insulation base, terminal members fixed to said body and universally yielding sockets conductively connected to said terminal members and adapted to engage said contact members, so as to support the vacuum tube out of physical contact with said base.

2. In a socket for vacuum tubes having contact prongs, a hollow insulation base having in one of its faces perforations for the free passage of said prongs, terminal members fixed to the opposite face of said base and projecting into the hollow thereof, and universally yielding sockets conductively connected to said terminal members and adapted to engage said prongs so as to support the vacuum tube at an elevation from and out of physical contact with said base.

3. In a socket for a vacuum tube or the like having contact prongs, a hollow insulation base having perforations in one of its faces for the free passage of said prongs, terminal members fixed to the opposite face of said base and projecting into the hollow thereof and sockets of coiled flexible wire carried by said terminal members within the hollow of said base and capable of engaging said contact prongs, so as to support said vacuum tube at an elevation from and out of physical contact with said base for the purpose specified.

4. In a socket for a vacuum tube or the like having contact prongs, the combination with an insulation base having contact terminals, of universally yielding sockets conductively connected to said terminals and capable of engaging said prongs, so as to support said tube spaced apart from and out of physical contact with said base for the purpose specified.

5. In a socket for a vacuum tube or the like having contact prongs, an insulation base having contact terminals, spring coils carried by said terminals and serving as sockets for said prongs, said coils being enlarged at their free ends to facilitate the passage of said prongs and capable of frictionally engaging the latter, so as to support the tube at an elevation from and out of physical contact with said base.

6. A shock absorbing socket for a vacuum tube having four prongs, comprising an insulating base having four perforations in its top arranged to receive the four prongs of a tube, a circuit terminal corresponding to each perforation and a universally resilient spring contact member electrically connected to each terminal adjacent the respective perforations to frictionally engage sides of the respective prongs inserted through the respective perforations and hold the tube out of contact with the base.

7. In a socket for a vacuum tube having projecting prongs, an insulation base, terminal members fixed to said base, universally yielding contacts conductively connected to said terminal members and adapted to engage said prongs, so as to support the vacuum tube out of physical contact with said base, and means for limiting the extent to which the prongs of a tube can be inserted.

8. In a socket for a vacuum tube having projecting prongs, an insulation base, terminal members fixed to said base, universally yielding contacts conductively connected to said terminal members and adapted to engage said prongs, so as to support the vacuum tube out of physical contact with said base, and means for limiting the angular displacement of the vacuum tube when inserted in said socket.

9. A shock absorbing socket for vacuum tubes having projecting prongs comprising an insulating base, four terminal members secured thereto and spaced apart from each other, universally yielding contact members, spring supports connected to said contact members and electrically connected to and supported by said terminal members and adapted to frictionally engage the sides of said prongs and support said tube out of contact with said base and a top member having perforations for guiding the prongs of said tube.

10. A shock absorbing socket for vacuum tubes having four projecting contact prongs comprising an insulating base with a central recess, universally yielding means for supporting a vacuum tube in said base but out of contact therewith comprising conducting members spaced apart from each other and secured to said base, each conducting member consisting of a terminal arm having its outer end extending outwardly beyond said recess and a spring contact portion adapted to engage the side of a tube prong.

11. In a socket for a vacuum tube having projecting contact prongs, an insulation base, terminal members fixed to said base, universally yielding contacts conductively connected to said terminal members and adapted to engage said prongs, so as to support the vacuum tube out of physical contact with said base, and means for limiting the rotation of a tube and the yielding contacts when the projecting prongs of the tube are in engagement with said universally yielding contacts.

12. In a socket for a vacuum tube or the like having contact prongs, the combination with an insulation base having contact terminals, of universally yielding contacts conductively connected to said terminals and capable of engaging said prongs, so as to support said tube spaced apart from and out of physical contact with said base for the purpose specified, and means for stripping the yielding contacts from the prongs of a tube when the tube is being withdrawn from the socket.

13. In a socket for a vacuum tube or the like having contact prongs, the combination with an insulation base having contact terminals, of universally yielding contacts conductively connected to said terminals and capable of engaging said prongs, so as to support said tube spaced apart from and out of physical contact with said base for the purpose specified, said base housing the yielding contacts.

14. In a socket for a vacuum tube or the like having contact prongs, the combination with an insulation base having contact terminals, of universally yielding contacts conductively connected to said terminals and capable of engaging said prongs, so as to support said tube spaced apart from and out of physical contact with said base for the purpose specified, said base having a top shielding said yielding contacts but having perforations for the free passage of tube prongs thereto.

15. A socket for vacuum tubes having projecting prongs comprising an insulating base, a series of conducting members insulated from each other, each having an outwardly projecting anchorage portion secured to the base, a spring contact portion and a spring portion connecting the contact portion to the anchorage portion, said spring portions being universally resilient to support the prongs of a tube so as to permit the tube to vibrate a limited amount in all directions.

CHARLES A. FRIEDRICH.